United States Patent
Ryoo et al.

(10) Patent No.: US 6,381,207 B1
(45) Date of Patent: Apr. 30, 2002

(54) OPTICAL PICKUP MOVABLE TO CONTROL BEAM SHIFT AND FIELD ANGLE IN AN OPTICAL DISK DRIVE

(75) Inventors: Byung-ryul Ryoo, Suwon; Pyong-yong Seong, Seoul; Seok-jung Kim, Suwon; Yong-ki Son, Suwon; Tae-kyung Kim, Suwon; Yong-jae Lee, Suwon; Jang-hoon Yoo, Seoul, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/410,627

(22) Filed: Oct. 1, 1999

(30) Foreign Application Priority Data

Oct. 2, 1998 (KR) ............................................. 98-41503

(51) Int. Cl.⁷ ............................................... G11B 33/02
(52) U.S. Cl. ...................................... 369/75.1; 369/121
(58) Field of Search ............................. 369/44.14, 121, 369/122, 75.1, 244, 44.17, 112.01, 119

(56) References Cited

U.S. PATENT DOCUMENTS 4,498,737 A * 2/1985 Doggett .................. 369/121 X

FOREIGN PATENT DOCUMENTS

JP 9-219033 8/1997

* cited by examiner

Primary Examiner—Paul W. Huber
(74) Attorney, Agent, or Firm—Staas & Halsey LLP

(57) ABSTRACT

An optical pickup of an optical disk drive. The optical pickup includes a laser beam source for generating a laser beam; a pickup base having an objective lens for projecting the laser beam generated from the laser beam source to an information recording surface of an optical disk; a variation adjusting plate which is movably disposed on the pickup base to be moved in vertical and lateral directions, and has a rotational hole formed at a central portion thereof; and a rotation adjusting plate including a rotational section having a predetermined curvature which is inserted into the rotational hole of the variation adjusting plate, and with a laser beam source fixed therein, the rotation adjusting plate being rotated with respect to the variation adjusting plate. An optical system including a collimating lens and a reflective mirror is fixed to the pickup base. Since the light path with respect to the field angle and the beam shift is adjusted by moving and/or rotating the light emitting point of the laser beam source with respect to the light axis of the collimating lens, the size of the optical pickup becomes smaller. Further, since the collimating lens and the light source are fixed to the respective structures, the light path is controlled regardless of the focal distance of the collimating lens. Accordingly, if the focal distance of the collimating lens has to be lengthened, the beam shift and the field angle can be precisely adjusted without enlarging the optical pickup.

21 Claims, 6 Drawing Sheets

LIGHT INTENSITY
DISTRIBUTION

LIGHT INTENSITY
DISTRIBUTION

OPTICAL PICKUP MOVABLE TO CONTROL BEAM SHIFT AND FIELD ANGLE IN AN OPTICAL DISK DRIVE

CROSS-REFERENCE TO RELATED APPLICATIONS

This application is based upon and claims priority of Korean Patent Application No. 98-41503 filed Oct. 2, 1998, the contents being incorporated herein by reference.

BACKGROUND OF THE INVENTION

1. Field of the Invention

The present invention relates to an optical pickup of an optical disk drive for recording and/or reproducing information on/from an optical disk. More particularly, the present invention relates to an optical pickup for an optical disk drive, the optical pickup having a light path controlling device to control occurrence of beam shift and field angle.

2. Description of the Related Art

A conventional optical disk drive projects a laser beam to an information recording surface of an optical disk, detects a signal based on the reflectivity, the phase, the polarized light variation and the like of the laser beam reflected from the information recording surface, and processes the signal thereby obtaining required information recorded on the information recording surface.

As shown in FIG. 1, the conventional optical disk drive includes an optical pickup 1 for projecting the laser beam to an optical disk 40 and for detecting the signal from the reflected laser beam, a driving section 2 for moving the optical pickup 1 to a predetermined position with respect to the information recording surface of the optical disk 40, a signal processing section 3 for processing the signal detected by the optical pickup 1 to convert the signal into the required information, and a controlling section 4 for controlling the above elements. The driving section 2 includes a spindle motor 5 for rotating the optical disk 40, a thread motor 6 for moving the optical pickup 1, and a servo section 7 for controlling the spindle motor 5 and thread motor 6.

When an external signal is input to the conventional optical disk drive shown in FIG. 1 and described above, the optical pickup 1 is moved in a radial direction of the optical disk 40 by the operation of the driving section 2, while recording information to the optical disk 40 and detecting the signals recorded in the information recording surface of the optical disk 40 by projecting the laser beam to the optical disk 40. The detected signals are processed by the signal processing section 3, converted into the required information, and then output to external devices.

In the above-described conventional optical disk drive, the optical pickup 1 is an essential element for recording information to and detecting information from the information recording surface of the optical disk 40. The optical pickup 1 includes a laser beam source for generating the laser beam, an optical system for projecting the laser beam generated from the laser beam source to the information recording surface of the optical disk 40, and a pickup base for fixedly supporting the laser beam source and the optical system. A laser diode is utilized as the laser beam source, and the optical system includes a collimating lens, a reflective mirror, and an objective lens.

However, an error with respect to a light emitting point and a light emitting angle may occur in the process of manufacturing the conventional optical pickup 1. Further, an error may occur in parts of the optical system during the process of manufacturing or assembling. One type of error, referred to hereinafter as "beam shift", occurs when the central line of an objective lens does not coincide with the central line of a collimating lens, resulting in the central line of the laser beam source not coinciding with the collimating lens. Another type of error, referred to hereinafter as "field angle", occurs when the central line of the laser beam does not coincide with the center of the collimating lens, causing the central line of the laser beam to be received by the objective lens in a non-perpendicular relation thereto. The combination of errors bring an asymmetric distribution of the laser beam intensity. The beam shift and/or field angle should be controlled within a predetermined range, since these two errors cause malfunctions in recording and/or reproducing the information with respect to the information recording surface of the optical disk 40. Accordingly, the optical pickup 1 usually includes light path controlling means for controlling the possible occurrence of the beam shift and field angle.

The optical pickup 1 of the conventional optical disk drive will be described in more detail hereinafter with respect to FIG. 2, which is a schematic diagram of the optical pickup 1. As shown in FIG. 2, the optical pickup 1 includes an objective lens 11 disposed at an upper-side surface of a pickup base 10, and a reflective mirror 12 disposed below the objective lens 11 to reflect the laser beam projected by the objective lens 11 through a light path. Further, a collimating lens 13 and a laser diode 14 are arranged in sequential order in the light path.

The laser beam generated from the laser diode 14 is transmitted through the collimating lens 13 and projected to the reflective mirror 12, where the laser beam is reflected to the objective lens 11 to be projected to the information recording surface of the optical disk 40 which is positioned thereabove.

The collimating lens 13 is supported within a first light path adjusting plate 20, while the laser diode 14 is supported within a second light path adjusting plate 30. The first light path adjusting plate 20 is movably disposed at the end portion of the pickup base 10 so as to move upward/downward and leftward/rightward with respect to the pickup base 10. Further, the second light path adjusting plate 30 is movably disposed at the end portion of the first light path adjusting plate 20 so as to be moved in vertical and lateral directions with respect to the collimating lens 13. When the first light path adjusting plate 20 is moved, the second light path adjusting plate 30 is also moved together therewith. However, the movement of the second light path adjusting plate 30 does not affect the movement of the first light path adjusting plate 20.

The beam shift and field angle can be adjusted by moving the first and second light path adjusting plates 20 and 30. The adjustment of the beam shift and field angle with the conventional optical pickup 1 will be described hereinafter with reference to FIGS. 3A through 3D.

FIGS. 3A through 3D are views illustrating the light path controlling operation of the conventional optical pickup 1. For the purpose of convenience in description, the laser diode 14, the collimating lens 13, the objective lens 11, and the optical disk 40 are arranged in a straight line in the figures while the reflective mirror 12 is omitted.

FIG. 3A illustrates the situation in which a beam shift has occurred. As shown in FIG. 3A, in the situation in which a beam shift has occurred, the laser beam generated from the laser diode 14 coincides with a central line of the collimating lens 13, while the objective lens 11 is not aligned with the collimating lens 13 so that the central line A of the laser beam is upwardly deviated toward the objective lens 11. Accordingly, the laser beam has an unbalanced light intensity distribution on the optical disk 40. The portions shown by the dotted lines in FIG. 3A are where the light intensity distribution is balanced.

The beam shift shown in FIG. 3A can be adjusted by moving the first light path adjusting plate 20 downward such that the central line A of the laser beam coincides with the center of the objective lens 11, as shown in FIG. 3B. Since the second light path adjusting plate 30 is moved along with the first light path adjusting plate 20, the beam shift can be adjusted without affecting the field angle.

FIG. 3C illustrates a situation in which the field angle has occurred, and FIG. 3D illustrates adjustment of the field angle.

As shown in FIG. 3C, the objective lens 11 and the collimating lens 13 are precisely aligned with each other, while the central line B of the laser beam generated from the laser diode 14 is deviated downward as a result of the non-coincidence of the laser beam with the center of the collimating lens 13. In a situation in which the field angle has occurred, the field angle may be adjusted by moving the second light path adjusting plate 30 upward such that the center of the laser beam coincides with the center of the collimating lens 13, as shown in FIG. 3D.

As described above, the beam shift and the field angle can be adjusted by moving the first and second light path adjusting plates 20 and 30 vertically and laterally. However, since the conventional optical pickup 1 described above is constructed to adjust the beam shift and the field angle by moving the first and second light path adjusting plates 20 and 30 vertically and laterally, a space is required for permitting the movement of the first and second light path adjusting plates 20 and 30. As a result of the space to permit movement of the first and second light path adjusting plates 20 and 30, a problem arises in that the size of the conventional optical pickup is increased.

Further, since the collimating lens 13 of the conventional optical pickup is supported by the first light path adjusting plate 20, the size of first light path adjusting plate 20 is enlarged when lengthening the focal distance of the collimating lens 13. Moreover, since the movement range of the collimating lens 13 becomes wide in proportion to the focal distance of the collimating lens 13, the size of the optical pickup inevitably becomes larger.

SUMMARY OF THE INVENTION

It is an object of the present invention to overcome the above-described problems of the prior art, and to provide an optical pickup of an optical disk drive to precisely adjust a beam shift and a field angle, without increasing the size of the optical pickup, by moving and/or rotating a light emitting point of a laser beam source with respect to a collimating lens to control the light path with respect to the beam shift and the field angle.

Another object of the present invention is to provide an optical pickup for an optical disk drive which is not increased in size, regardless of the focal distance of the collimating lens, even when a focal distance of a collimating lens is increased as a result of a controlling operation of the light path with respect to a beam shift and a field angle.

Objects and advantages of the present invention are achieved in accordance with embodiments of the present invention with an optical pickup of an optical disk drive comprising a laser beam source to generate a laser beam; a pickup base including an objective lens to project the laser beam generated from the laser beam source to an information recording surface of an optical disk; and a light path controlling device, disposed on the pickup base, to support the laser beam source, and to control a light path of the laser beam with respect to a field angle and a beam shift by at least one of moving and rotating the light emitting point of the laser beam source with respect to an optical axis of the objective lens.

The optical pickup may further comprise a collimating lens to convert the laser beam generated from the laser beam source into a parallel ray, and a reflective mirror to reflect the laser beam transmitted through the collimating lens to the objective lens, wherein the collimating lens and the reflective mirror are respectively fixed to the pickup base.

In accordance with the present invention, the light path controlling device comprises a variation adjusting plate disposed on the pickup base and movable in vertical and lateral directions, the variation adjusting plate including and a rotational hole formed in a central portion thereof; and a rotation adjusting plate including a rotational section having a predetermined curvature and a laser beam source fixed to the rotation adjusting plate, the rotational section being inserted into the rotational hole of the variation adjusting plate and rotatable with respect to the variation adjusting plate, wherein the field angle is adjusted by moving the variation adjusting plate in the vertical and lateral directions, and the beam shift is adjusted by rotating the rotation adjusting plate.

The rotational hole and the rotational section may be formed into hemispherical shapes which correspond to each other so that the rotational section is rotated while contacting the rotational hole.

The rotational hole may be formed into a circular shape, and the rotational section may be formed into a hemispherical shape, so that the rotational section is rotated while contacting the circular rotational hole.

In accordance with the present invention, the pickup base includes a plurality of screw fitting holes formed around an opening in the pickup base, the variation adjusting plate includes a plurality of screw passing holes aligned with the screw fitting holes, and the variation adjusting plate is fixed to the pickup base by a plurality of bolts which are inserted into the plurality of screw fitting holes after being passed through the screw passing holes, wherein the respective diameters of the plurality of screw passing holes in the variation adjusting plate are larger than the respective diameters of each bolt, wherein the variation adjusting plate is moved in the vertical and lateral directions to a proper position, and then fixed in the proper position.

In accordance with embodiments of the present invention, the variation adjusting plate includes an upper side, a lower side, a right side and a left side, and the rotation adjusting plate is fixed to the variation adjusting plate by one of the upper and lower sides and by one of right and left sides with an elastic member, and two sides of the variation adjusting plate which are not fastened by the elastic member are fastened by respective adjusting screws, wherein the rotation adjusting plate is rotated when the respective adjusting screws are rotated.

In accordance with the present invention, one end of the elastic member contacts the rotation adjusting plate, while another end of the elastic member is aligned with a screw passing hole of the variation adjusting plate, and is fastened to the variation adjusting plate by a bolt passed through the screw passing hole, wherein the elastic member elastically supports the rotation adjusting plate.

Objects and advantages of the present invention are achieved in accordance with preferred embodiments of the present invention, with an optical pickup of an optical disk drive comprising a laser beam source to generate a laser beam; an optical system including a collimating lens to convert the laser beam generated from the laser beam source into a parallel ray, a reflective mirror to reflect the parallel laser beam converted by the collimating lens in a vertical direction, and an objective lens to project the laser beam reflected from the reflective mirror to an information recording surface of an optical disk; a pickup base to fixedly support the collimating lens, the reflective lens, and the objective lens of the optical system; a variation adjusting plate disposed on the pickup base and movable in vertical and lateral directions, the variation adjusting plate having a rotational hole formed in a central portion of the variation adjusting plate, and a rotation adjusting plate including a rotational section having a predetermined curvature inserted into the rotational hole of the variation adjusting plate, and the laser beam source fixed therein, the rotation adjusting plate being rotated with respect to the variation adjusting plate, wherein a light path with respect to a field angle and a beam shift is controlled by at least one of moving and rotating a light emitting point of the laser beam source with respect to an optical axis of the collimating lens.

In accordance with the present invention, since the collimating lens is fixed to the pickup base, which is a separate structure with respect to the light path controlling device, and since a light path with respect to a field angle and a beam shift is controlled by moving and/or rotating a light emitting point of the laser beam source with respect to an optical axis of the collimating lens, less space is required for the movement of the light path controlling device, and the size of the optical pickup becomes smaller.

Further, in accordance with the present invention, since the collimating lens is fixed to the pickup base, which is the separate structure with respect to the light path controlling device, the light path with respect to the field angle and the beam shift can be controlled regardless of the focal distance of the collimating lens. Accordingly, even when the focal distance of the collimating lens is lengthened, the beam shift and the field angle can be precisely adjusted without increasing the size of the optical pickup.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
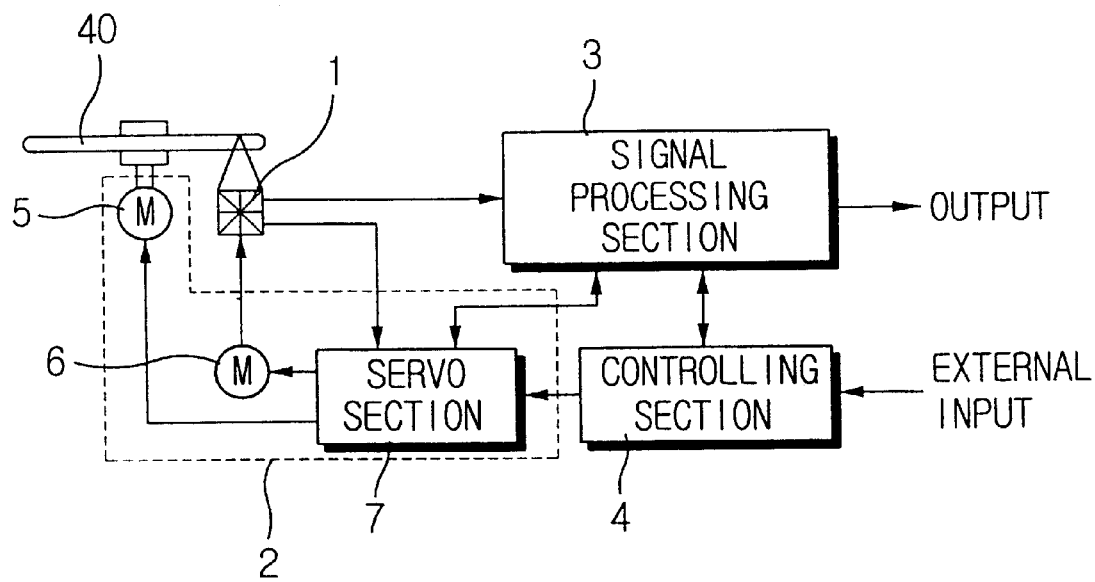
FIG. 1 is a schematic block diagram showing the structure of a conventional optical disk drive.
Figure 2:
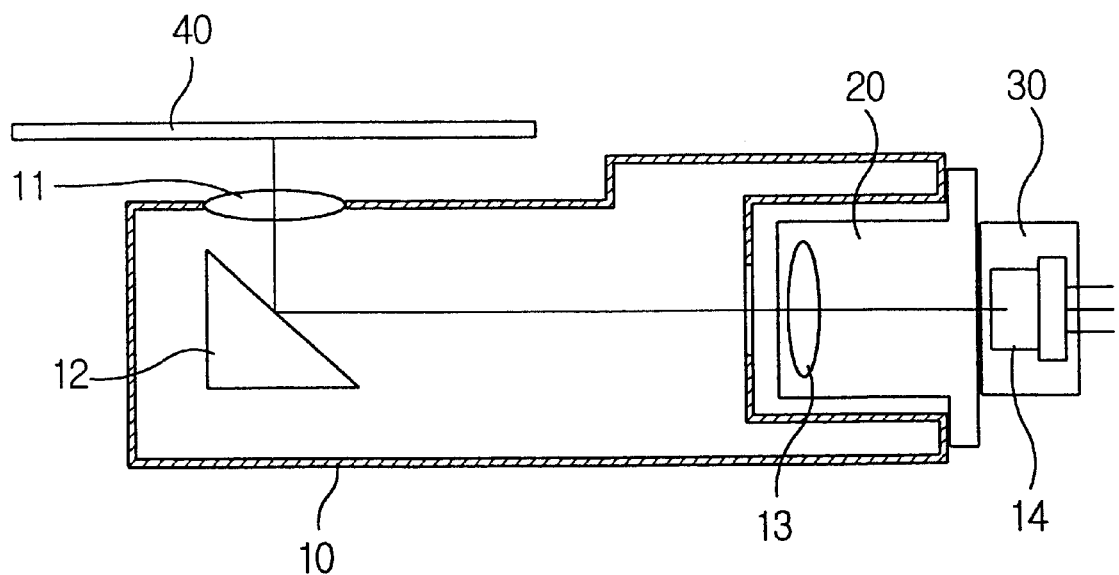
FIG. 2 is a schematic sectional view of a conventional optical pickup.

Reference will now be made in detail to the preferred embodiments of the present invention, examples of which are illustrated in the accompanying drawings, wherein like reference numerals refer to like elements throughout.

Figure 4:
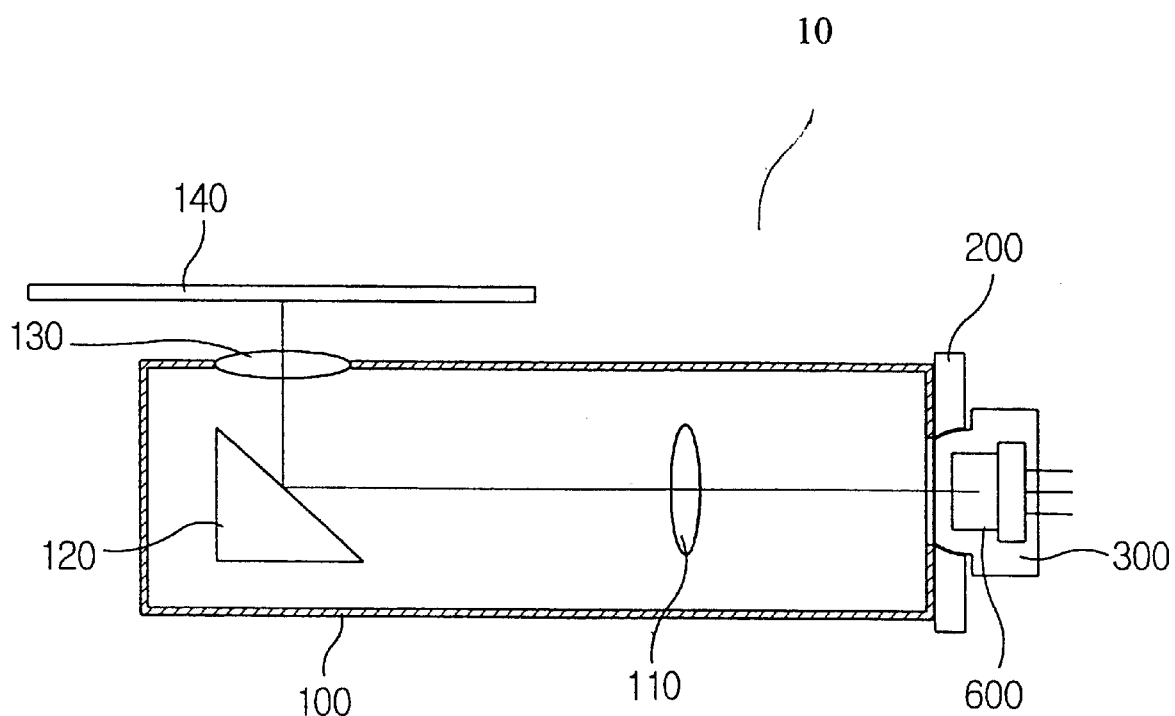
FIG. 4 is a schematic sectional view of an optical pickup in accordance with a preferred embodiment of the present invention.
Figure 5:
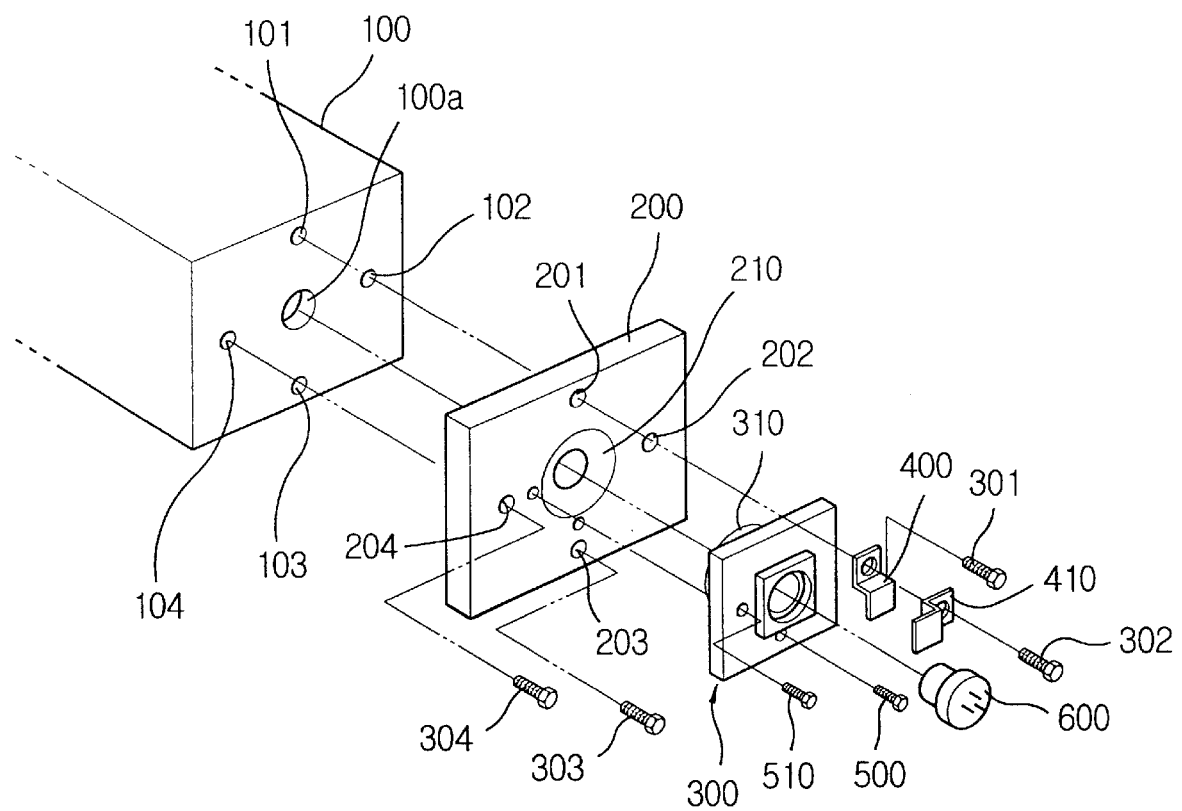
FIG. 5 is an exploded perspective view of a light path controlling device of the optical pickup in accordance with the preferred embodiment of the present invention.
Figure 6:
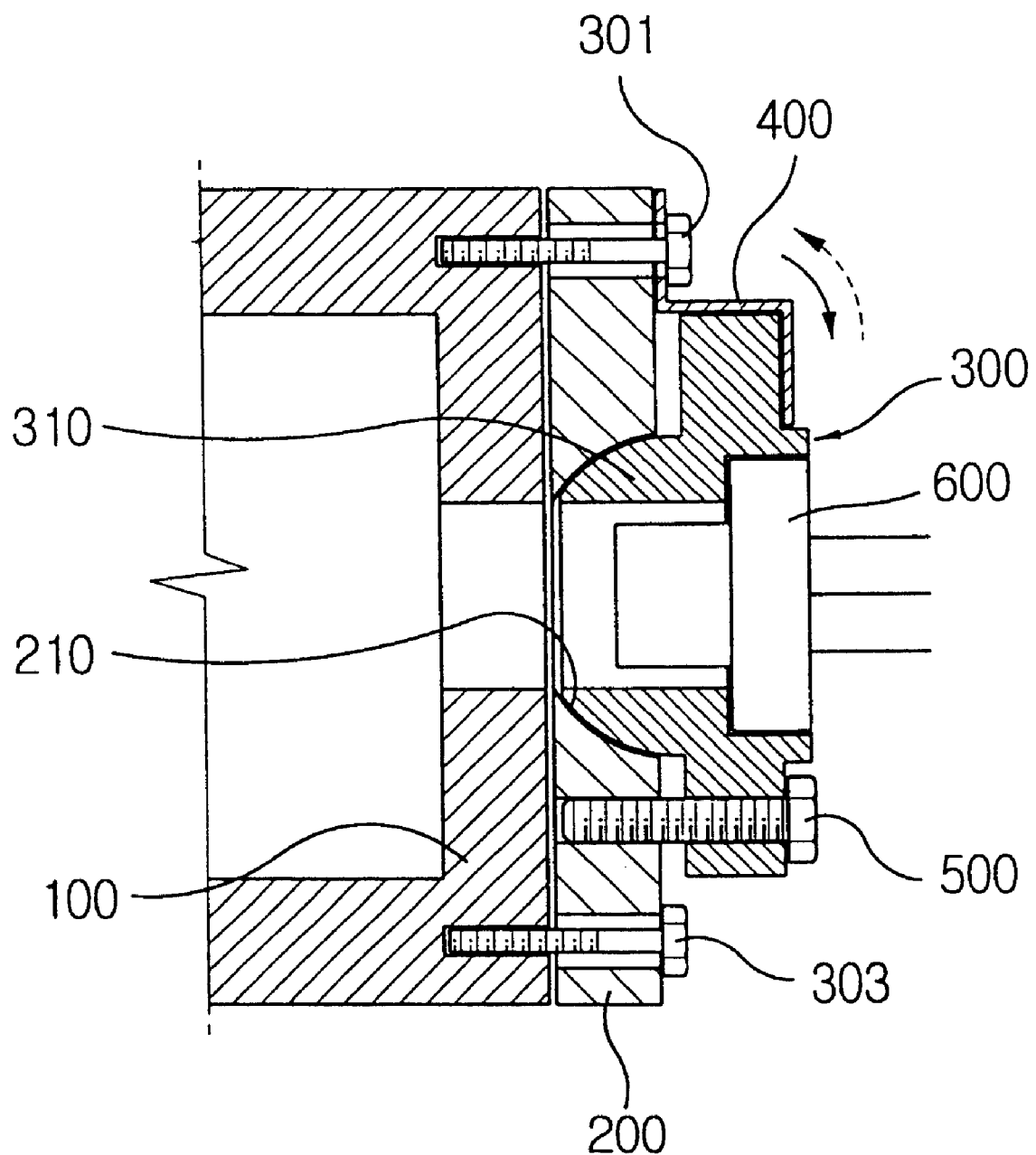
FIG. 6 is a sectional view of the assembled light path controlling device in accordance with the preferred embodiment of the present invention.

An optical pickup in accordance with preferred embodiments of the present invention will be described below with reference to FIGS. 4–6. More specifically, FIG. 4 is a schematic block diagram of the optical pickup in accordance with the preferred embodiments of the present invention. FIGS. 5 and 6 are an exploded perspective view and a sectional view, respectively, illustrating a light path controlling device in accordance with the preferred embodiment of the present invention.

As shown in FIGS. 4–6, the optical pickup 10 includes a pickup base 100, a collimating lens 110, a reflective mirror 120, an objective lens 130, and an optical disk 140. The optical pickup 10 also includes a variation adjusting plate 200, a rotation adjusting plate 300, and a laser beam source 600.

As shown in FIG. 4, the objective lens 130 is disposed on an upper side of the pickup base 100 to project a laser beam generated from the laser beam source 600 toward the information recording surface of the optical disk 140. Further, the collimating lens 110 and the reflective mirror 120 are positioned in the pickup base 100, respectively. The collimating lens 110 converts the laser beam generated from the laser beam source 600 into a parallel ray, and the reflective mirror 120 reflects the laser beam converted by the collimating lens 110 toward the objective lens 130.

The variation adjusting plate 200 is movably disposed on one side of the pickup base 100, and is movable at least vertically and laterally. As shown in FIG. 5, a plurality of screw fitting holes 101, 102, 103, 104 are formed in the pickup base 100 around an opening 100a, and a plurality of screw passing holes 201, 202, 203, 204 are formed in the variation adjusting plate 200 aligned with the screw fitting holes 101, 102, 103, 104, respectively. The variation adjusting plate 200 is fixedly disposed on one side of the pickup base 100 by a plurality of bolts 301, 302, 303, 304 which are inserted into the screw fitting holes 101, 102, 103, 104, respectively, after being passed through the screw passing holes 202, 202, 203, 204, respectively.

The respective diameters of the screw passing holes 201, 202, 203, 204 are greater than the respective diameters of the bolts 301, 302, 303, 304. Accordingly, loosening the bolts 301, 302, 303, 304 to a predetermined degree enables the variation adjusting plate 200 to be moved vertically and laterally with respect to the pickup base 100. As the bolts 301, 302, 303, 304 are tightened, the variation adjusting plate 200 is fixed to the pickup base 100. Accordingly, the variation adjusting plate 200 can be moved to the desired position with respect to the pickup base 100 and fixed thereon. A rotational hole 210 is formed in the middle portion of the variation adjusting plate 200 while intercommunicating with the opening 100a of the pickup base 100. The rotational hole 210 is provided for a light path of the laser beam and installation of the rotation adjusting plate 300, which will be described in more detail hereinafter. The rotational hole 210 may be formed into either a hemispherical shape, or a circular shape.

The rotation adjusting plate 300 includes a rotational section 310 having a predetermined curvature and which is inserted into the rotational hole 210 of the variation adjusting plate 200. Accordingly, the rotation adjusting plate 300 is disposed on the variation adjusting plate 200, to be rotated vertically and laterally. More specifically, as shown in FIG. 5, the rotation adjusting plate 300 rotates in a lateral direction, i.e., about a line connecting the screw passing holes 201, 203, and in a vertical direction, i.e., about a line connecting the screw passing holes 202 and 204. The laser beam source 600, which is preferably a laser diode, is disposed within the rotation adjusting plate 300.

Further, when the rotational section 310 of the rotation adjusting plate 300 is in a state inserted into the rotational hole 210 of the variation adjusting plate 200, one of the upper and lower portions of the rotation adjusting plate 300 is fixed to the variation adjusting plate 200 by an elastic member 400, and one of the right and left portions of the rotation adjusting plate 300 is fixed to the variation adjusting plate 200 by an elastic member 410. The portion of the upper and lower portions of the rotation adjusting plate 300 which is not fixed by the elastic member 400 is fixed to the variation adjusting plate 200 by an adjusting screw 500, while the portion of the right and left portions of the rotation adjusting plate 300 which is not fixed by elastic member 410 is fixed to the variation adjusting plate 200 by an adjusting screw 510. Each one of the ends of the elastic members 400 and 410 contacts the rotation adjusting plate 300, while the other end is aligned with the screw passing holes 201 and 202, respectively, of the variation adjusting plate 200 and fixed to the variation adjusting plate 200 by the bolts 301 and 302, respectively, which pass through the respective screw passing holes 201 and 202. Accordingly, the elastic members 400 and 410 elastically support the rotation adjusting plate 300. By loosening or tightening the adjusting screw 500, the rotation adjusting plate 300 can be rotated in the vertical direction, and by loosening or tightening the adjusting screw 510 the rotation adjusting plate 300 can be rotated in the lateral direction.

The light emitting point of the laser beam source 600 is preferably positioned within 1 mm from the center of curvature of the rotational section 310 of the rotation adjusting plate 300.

The light path controlling operation, i.e., the beam shift and field angle adjusting operation of the optical pickup 10, in accordance with the preferred embodiments of the present invention will now be described in greater detail hereinbelow.

Figure 3A:
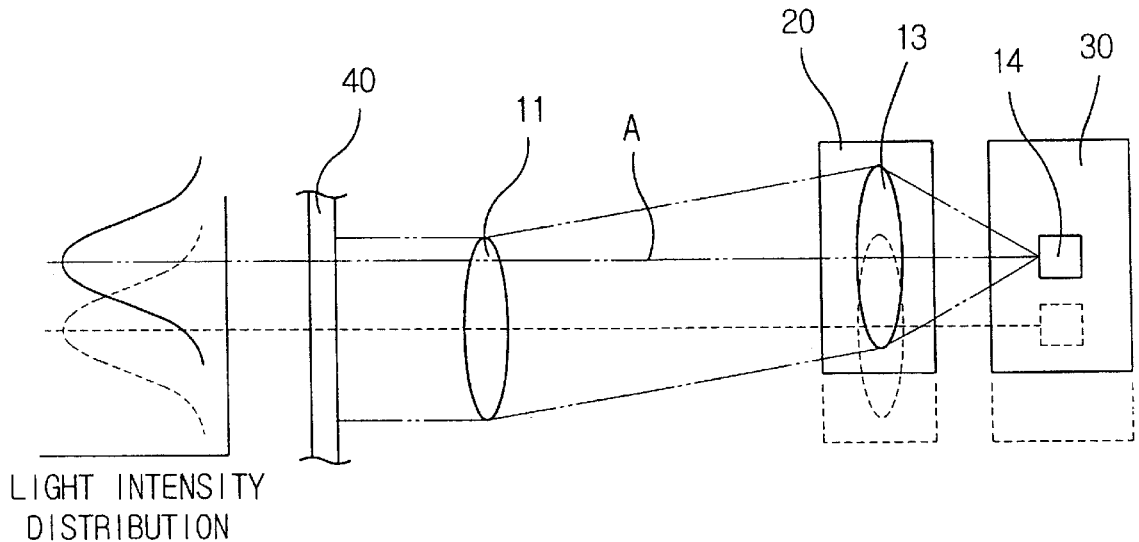
FIGS. 3A–3D are views illustrating a light path controlling operation in the conventional optical pickup.
Figure 3B:
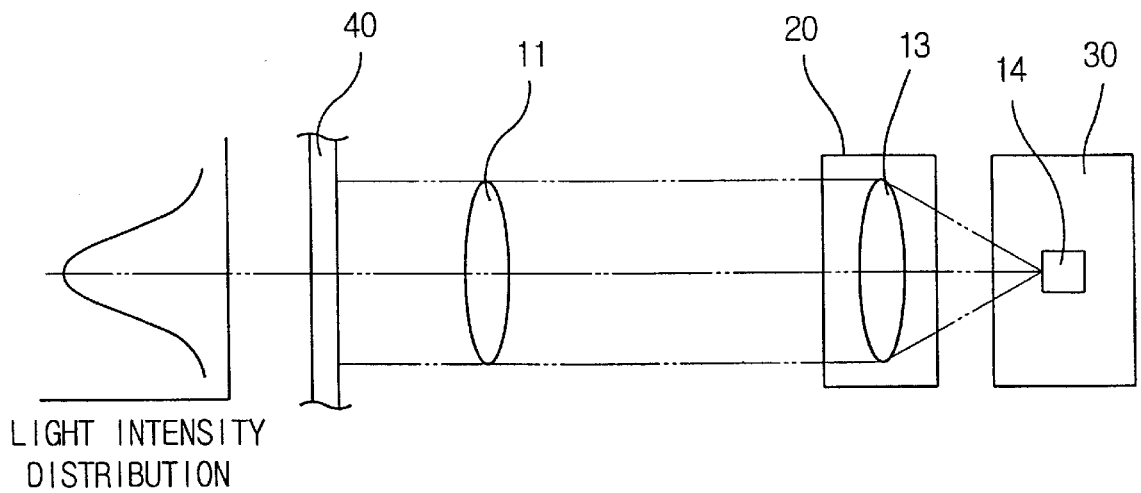
Figure 3C:
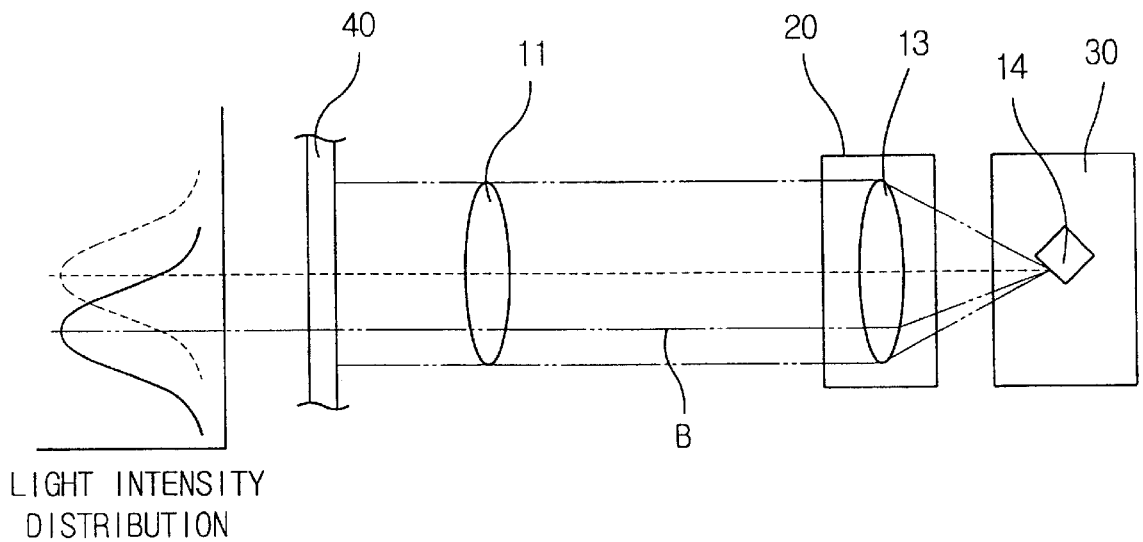
Figure 3D:
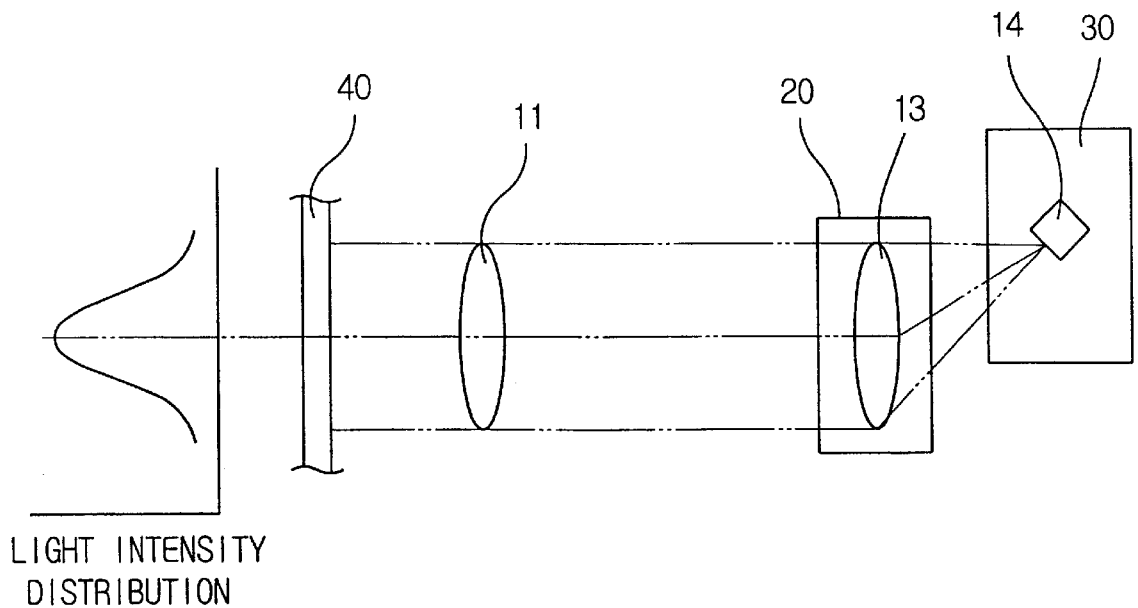

As shown in FIGS. 3C and 3D, conventionally, additional space is required for the movement of the second light path adjusting plate 30 in the event that the laser beam generated from the laser beam source 14 does not coincide with the central line of the collimating lens 13 and the center of the laser beam is deviated downward. More specifically, additional space is required because the second light path adjusting plate 30 has to be moved upward such that the center of the laser beam source 14 coincides with the central portion of the collimating lens 13 to adjust the field angle. In comparison with the conventional optical pickup, in the optical pickup in accordance with the present invention, the center of the laser beam source 600 is adjusted to coincide with the center of the collimating lens 110 by rotating the rotation adjusting plate 300, and no additional space is required.

The light path controlling operation to adjust the field angle according to the present invention will now be described below in greater detail with reference to FIG. 6. As shown in FIG. 6, in the event that a field angle has occurred, the adjusting screw 500 at the lower end of the rotation adjusting plate 300 is rotated in a tightening direction. As the adjusting screw 500 is rotated, since the other side of the rotation adjusting plate 300 is pressingly supported by the elastic member 400, the rotational section 310 inserted into the rotational hole 210 of the variation adjusting plate 200 is rotated in a clockwise direction along the hemisphere having a predetermined curvature in FIG. 6 to shift the light emitting point of the laser beam upward (solid line arrow). Accordingly, the center of the laser beam source 600 is aligned with the center of the collimating lens 110. Moreover, by rotating the adjusting screw 500 in a loosening direction, the rotational section 310 is rotated in a counter-clockwise direction in FIG. 6 (dotted line arrow) to shift the light emitting point of the laser beam downward (dotted line arrow). Further, the direction of the light beam can be shifted to the right and left (laterally) in a similar manner by the adjusting screw 510 and the elastic member 410. By rotatably varying the light emitting point of the laser beam source 600, the light path with respect to the field angle is controlled.

Further, conventionally, as shown in FIG. 3A, in the event that the beam shift has occurred, the laser beam generated from the laser beam source 14 does not coincide with the central line of the objective lens 11. In accordance with the preferred embodiments of the present invention, in the event the beam shift has occurred, the respective bolts 301, 302, 303, 304 are loosened to the proper degree and the variation adjusting plate 200 is moved downward until the light beam is aligned with the central line of the objective lens 130. The variation adjusting plate 200 is then re-fixed by tightening the respective bolts 301, 302, 303, 304. In this situation, since the rotational section 310 of the rotation adjusting plate 300 is inserted into the rotational hole 210 of the variation adjusting plate 200, the rotation adjusting plate 300 is also moved when the variation adjusting plate 200 is moved.

As described above, in accordance with preferred embodiments of the present invention, the optical pickup of the optical disk drive includes the collimating lens 110 fixed to the pickup base 100, which is a separate structure with respect to the light path controlling device, and the light path with respect to the field angle and the beam shift is adjusted by moving and/or rotating the light emitting point of the laser beam source 600 with respect to the optical axis of the collimating lens 110, so that the space for the movement of the light path controlling device can be reduced, and thus, the size of the optical pickup becomes smaller.

Further, since the collimating lens 110 is fixed to the pickup base 100, which is a separate structure with respect to the light path controlling device, the light path with respect to the field angle and the beam shift can be controlled regardless of the focal distance of the collimating lens 110. Accordingly, if the focal distance of the collimating lens 110 has to be lengthened, the beam shift and the field angle can be precisely adjusted without enlarging the optical pickup.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An optical pickup for an optical disk drive, comprising:
 a laser beam source to generate a laser beam;
 a pickup base including an objective lens to project the laser beam generated from the laser beam source to an information recording surface of an optical disk; and
 a light path controlling device, attached to the pickup base, to support the laser beam source, and to control the light path with respect to a field angle and a beam shift by moving and rotating a light emitting point of the laser beam source with respect to an optical axis of the objective lens.

2. The optical pickup as recited in claim 1, further comprising:
a collimating lens to convert the laser beam generated from the laser beam source into a parallel ray; and
a reflective mirror to reflect the laser beam transmitted through the collimating lens to the objective lens,
wherein the collimating lens and the reflective mirror are respectively fixed on the pickup base.

3. The optical pickup as recited in claim 1, wherein the light path controlling device comprises:
a variation adjusting plate disposed on the pickup base and movable in vertical and lateral directions, the variation adjusting plate including a rotational hole formed in a central portion of the variation adjusting plate; and
a rotation adjusting plate including a rotational section having a predetermined curvature and a laser beam source fixed to the rotation adjusting plate, the rotational section being inserted into the rotational hole of the variation adjusting plate to be rotated with respect to the variation adjusting plate,
wherein the field angle is adjusted by moving the variation adjusting plate in the vertical and lateral directions, and the beam shift is adjusted by rotating the rotation adjusting plate.

4. The optical pickup as recited in claim 3, wherein the rotational hole and the rotational section have hemispherical shapes corresponding to each other, and the rotational section is in contact with the rotational hole as the rotational section is rotated.

5. The optical pickup as recited in claim 3, wherein the rotational hole has a circular shape, and the rotational section has a hemispherical shape, and the rotational section is in contact with the circular rotational hole as the rotational section is rotated.

6. The optical pickup as recited in claim 3, wherein the pickup base includes a plurality of screw fitting holes formed around an opening in the pickup base and the variation adjusting plate includes a plurality of screw passing holes aligned with the screw fitting holes, and a plurality of bolts are inserted into the plurality of screw fitting holes after being passed through the screw passing holes,
wherein the plurality of screw passing holes in the variation adjusting plate have a larger diameter than respective diameters of each bolt, and wherein the variation adjusting plate is moved in the vertical and lateral directions to a proper position, and then fixed in the proper position.

7. The optical pickup as recited in claim 3, wherein the variation adjusting plate includes an upper side, a lower side, a right side and a left side, and the rotation adjusting plate is fixed to the variation adjusting plate by one of the upper and the lower side and by one of the right and the left side with an elastic member, and two sides which are not fastened by the elastic member are fastened by respective adjusting screws, wherein the rotation adjusting plate is rotated in response to rotation of the respective adjusting screws.

8. The optical pickup as recited in claim 7, wherein one end of the elastic member contacts the rotation adjusting plate, and another end of the elastic member is aligned with a screw passing hole of the variation adjusting plate and is fastened to the variation adjusting plate by a bolt passed through the screw passing hole, wherein the elastic member elastically supports the rotation adjusting plate.

9. An optical pickup, comprising:
a laser beam source to generate a laser beam;
a pickup base;
a collimating lens attached to the pickup base to convert the laser beam generated by the laser beam source to a parallel ray; and
a light path controlling device, attached to the pickup base and separate from the collimating lens, to control a light path with respect to a field angle and a beam shift by moving and rotating a light emitting point of the laser beam source with respect to an optical axis of the collimating lens.

10. An optical disk drive including an optical pickup to project a laser beam to an optical disk and to detect a signal reflected from the optical disk, a driving section to move the optical pickup toward a desired position of an information recording surface of the optical disk, a signal processing section to process and convert the signal detected by the optical pickup into information, and a controlling section to control the optical pickup, the driving section, and the signal processing section, the optical pickup comprising:
a laser beam source to generate the laser beam;
a pickup base having an objective lens to project the laser beam generated from the laser beam source to the information recording surface of the optical disk; and
a light path controlling device attached to the pickup base to support the laser beam source, and to control a light path with respect to a field angle and a beam shift by moving and rotating a light emitting point of the laser beam source with respect to an optical axis of the objective lens.

11. The optical disk drive as recited in claim 10, wherein the light path controlling device comprises:
a variation adjusting plate attached to the pickup base and movable in vertical and lateral directions, the variation adjusting plate having a rotational hole formed in a central portion of the variation adjusting plate; and
a rotation adjusting plate including a rotational section having a predetermined curvature inserted into the rotational hole of the variation adjusting plate, and a laser beam source fixed to the rotation adjusting plate, the rotation adjusting plate being rotated with respect to the variation adjusting plate,
wherein the field angle is adjusted by moving the variation adjusting plate in the vertical and lateral directions, and the beam shift is adjusted by rotating the rotation adjusting plate.

12. A light path controlling device for controlling a light path of a laser beam source of an optical pickup, comprising:
a variation adjusting plate movable in a first direction and a second direction; and
a rotation adjusting plate rotatably attached to the variation adjusting plate, the laser beam source being attached to the variation adjusting plate,
wherein movement of the variation adjusting plate moves a light emitting point of the laser beam source in at least one of the first and second directions, and movement of the rotation adjusting plate rotates a light emitting point of the laser beam source.

13. The light path controlling device as recited in claim 12, wherein the rotation adjusting plate moves with movement of the variation adjusting plate, and the movement of the rotation adjusting plate does not affect movement of the variation adjusting plate.

14. The light path controlling device as recited in claim 12, wherein the variation adjusting plate includes a rotational hole formed in a central portion thereof, and the rotation adjusting plate includes a rotational section having a predetermined curvature, which is inserted into the rotational hole in the variation adjusting plate, in which the rotation adjusting plate rotates.

15. The light path controlling device as recited in claim 14, wherein the rotational hole and the rotational section have hemispherical shapes corresponding to each other, and the rotational section is in contact with the rotational hole as the rotational section rotates.

16. The light path controlling device as recited in claim 14, wherein the rotational hole has a circular shape, and the rotational section has a hemispherical shape and the rotational section is in contact with the rotational hole as the rotational section is rotated.

17. The light path controlling device as recited in claim 12, wherein the optical pickup includes a collimating lens and a center of the laser beam source is adjusted to coincide with the optical axis of the collimating lens by at least one of rotating the rotation adjusting plate and moving the variation adjusting plate.

18. The light path controlling device as recited in claim 12, wherein the optical pickup includes a pickup base, the variation adjusting plate is attached to the pickup base by a bolt passing through a screw passing hole, the screw passing hole having a larger diameter than a diameter of the bolt, wherein the variation adjusting plate is moved in at least one of the first and second directions to a proper position, and then fixed in the proper position.

19. The light path controlling device as recited in claim 12, wherein the rotation adjusting plate is attached to the variation adjusting plate by an adjusting screw and an elastic member opposite the adjusting screw, and wherein the rotation adjusting plate is rotated in response to the rotation of the adjusting screw.

20. The light path controlling device as recited in claim 12, wherein movement of the variation adjusting plate in the vertical and lateral directions adjusts a field angle, and rotation of the rotation adjusting plate adjusts a beam shift.

21. An optical pickup of an optical disk drive, comprising:

a laser beam source to generate a laser beam;

an optical system including a collimating lens to convert the laser beam generated from the laser beam source into a parallel ray, a reflective mirror to reflect the parallel laser beam converted by the collimating lens in a vertical direction, and an objective lens to project the laser beam reflected from the reflective mirror to an information recording surface of an optical disk;

a pickup base to fixedly support the collimating lens, the reflective lens and the objective lens of the optical system;

a variation adjusting plate attached to the pickup base and movable in vertical and lateral directions, the variation adjusting plate having a rotational hole formed in a central portion of the variation adjusting plate; and a rotation adjusting plate including a rotational section having a predetermined curvature inserted into the rotational hole of the variation adjusting plate, and the laser beam source fixed therein, wherein the rotation adjusting plate is rotated with respect to the variation adjusting plate, and wherein a light path with respect to a field angle and a beam shift is controlled by at least one of moving and rotating a light emitting point of the laser beam source with respect to an optical axis of the collimating lens.

* * * * *